United States Patent
Ollier

(10) Patent No.: US 8,438,692 B2
(45) Date of Patent: May 14, 2013

(54) WIPER BLADE WITH CONNECTOR AND METHOD FOR MAKING SUCH BLADE

(75) Inventor: Nicolas Ollier, Arsac En Velay (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 289 days.

(21) Appl. No.: 12/808,858

(22) PCT Filed: Dec. 17, 2008

(86) PCT No.: PCT/EP2008/067755
§ 371 (c)(1),
(2), (4) Date: Jul. 19, 2010

(87) PCT Pub. No.: WO2009/077563
PCT Pub. Date: Jun. 25, 2009

(65) Prior Publication Data
US 2010/0293737 A1 Nov. 25, 2010

(30) Foreign Application Priority Data
Dec. 18, 2007 (FR) .................................... 07 08810

(51) Int. Cl.
*B60S 1/40* (2006.01)
(52) U.S. Cl.
USPC .................. 15/250.32; 15/250.31; 15/250.361
(58) Field of Classification Search ............... 15/250.32, 15/250.201, 250.43, 250.361, 250.44, 250.31, 15/250.46, 250.451, 250.352, 250.333
See application file for complete search history.

(56) References Cited

U.S. PATENT DOCUMENTS

| 4,014,061 | A  | * | 3/1977  | Jurowski et al.   | 15/250.43  |
|-----------|----|---|---------|-------------------|------------|
| 7,350,259 | B2 | * | 4/2008  | Walworth et al.   | 15/250.201 |
| 7,587,783 | B1 | * | 9/2009  | Lin               | 15/250.43  |
| 7,945,986 | B2 | * | 5/2011  | Kim               | 15/250.201 |
| 8,220,105 | B2 | * | 7/2012  | Jarasson et al.   | 15/250.32  |
| 8,281,453 | B2 | * | 10/2012 | Yang et al.       | 15/250.32  |
| 2006/0207050 | A1 | * | 9/2006  | Shanmugham et al. | 15/250.43  |
| 2008/0263809 | A1 | * | 10/2008 | Bousset           | 15/250.32  |
| 2009/0007364 | A1 | * | 1/2009  | Jarasson et al.   | 15/250.32  |
| 2009/0056049 | A1 | * | 3/2009  | Jarasson et al.   | 15/250.32  |

FOREIGN PATENT DOCUMENTS

| FR | 2 868 376 A1 | 10/2005 |
| FR | 2 894 544 A1 | 6/2007 |
| WO | 02/34595 A1  | 5/2002 |

OTHER PUBLICATIONS

International Search Report w/translation from PCT/EP2008/067755 dated Mar. 3, 2009 (4 Pages).

* cited by examiner

*Primary Examiner* — Jeanette E. Chapman
(74) *Attorney, Agent, or Firm* — Osha Liang LLP

(57) ABSTRACT

The invention relates to a wiper blade (1) that comprises a bearing structure (20) in which a flexible vertebra (23) is longitudinally inserted and on the sides of which are formed openings (25*a*, 25*b*, 26*a*, 26*b*, 27*a*, 27*b*) exposing the side edges (23*a*) of the vertebra (23), as well as a connector (50) that is fitted substantially transversally onto the bearing structure (20) at the level of the openings (25*a*, 25*b*, 26*a*, 26*b*) and that is blocked in terms of movement in the fitting direction thereof by the portions of the side edges (23*a*) protruding from said openings (25*a*, 25*b*, 26*a*, 26*b*). The invention is characterized in that the connector (50) includes at least one deformation (70*a*) extending inside a notch (71*a*) formed in the vertebra (23) at a portion of a side edge (23*a*) and accessible via an opening (27*a*).

17 Claims, 5 Drawing Sheets

WIPER BLADE WITH CONNECTOR AND METHOD FOR MAKING SUCH BLADE

The present invention relates to a wiper blade, the structure of which integrates a connector providing the connection thereof with a wiping arm.

The invention also relates to a method for making such a wiper blade.

The invention finds a particularly advantageous application in the field of flat wiper blades, which are currently called "flat blades".

A flat wiper blade is mainly composed of a flexible wiping rubber blade which is supported by a deformable structure in which a flexible vertebra is integrated, and on which is fitted a connector making it possible to link the flat wiper blade to any driving mechanism. In this respect, a flat wiper blade is known wherein the connector is made integral with the bearing structure through a transversal fitting and locking in position via the vertebra.

In concrete terms, both longitudinal sides of the bearing structure are provided with openings exposing the side edges of the vertebra which is inserted inside. The connector is provided with an internal recess having a shape substantially matching that of the pierced portion of the bearing structure.

The parts of the connector, which are intended to be engaged at the level of the openings, are claw-shaped. The general overall dimensions thereof is compatible for a fitting only with the single pierced portion of the bearing structure whereas the internal shape thereof is substantially matching the external shape resulting from the association of the bearing structure and the vertebra at the level of an opening. The assembly is so arranged that, once inserted into the bearing structure, the vertebra locks the connector according to the fitting direction thereof with the side edges of said vertebra then playing the part of stops for the claws of said connector.

This type of mounting, however, has the drawback of providing an insufficient holding of the vertebra at the level of the connector. An assembly clearance is in fact necessary to enable the insertion of the vertebra between the claws of the connector. Under these conditions, it is impossible for the wiper blade to give a sufficient rigidity to meet such requirements, in terms of side pivoting and longitudinal torsion, of the specifications of many other vehicle manufacturers.

Thus, the technical problem to be solved by the object of the present invention is to provide a wiper blade that comprises a bearing structure in which a flexible vertebra is longitudinally inserted, and on the sides of which are formed openings exposing the side edges of the vertebra as well as a connector which is fitted substantially transversally onto the bearing structure at the level of the openings and that is locked in terms of movement in the fitting direction thereof by the portions of the side edges protruding from said openings, a wiper blade which would make it possible to avoid the problems of the state of the art by providing a substantially improved holding of the vertebra at the level of the connector.

The solution to the technical problem consists, according to the present invention, in that the connector includes at least one deformation extending inside a notch which is formed in the vertebra at the level of a portion of a side edge accessible via an opening.

To hold the vertebra at the level of the connector, the principle thus consists in using a particular vertebra in the sense that it has one or several notch/notches substantially in the central part, and in locally deforming any portion of the connector extending opposite the notch. Each deformation is made until sufficient material has accumulated within the matching notch in order to generate the locking of the vertebra inside the bearing structure. Such a locking must be considered as omnidirectional since it is, in particular, capable of immobilising the vertebra in terms of translation along the direction of insertion thereof, and of eliminating the assembly clearance between said vertebra and the connector.

The invention, as it is defined, has the advantage of giving the connector a capacity of holding the vertebra which is much better than that of the counterparts thereof in the state of the art. Generally speaking, this gives improved wiping quality to the wiper blade and more particularly it makes it possible to comply with the specifications of the automobile manufacturers.

The present invention also relates to the characteristics which will appear when reading the following description and which must be considered independently or in all the possible technical combinations thereof.

This description, which is given as a non-limitative example, is intended to better explain what the invention consists in, and how it can be embodied. It is, in addition, given while referring to the appended drawings wherein.

For reasons of clarity, the same elements have been referred to by similar reference numbers. Similarly, only the essential elements for understanding the invention have been shown, without any respect of the scale and in a schematic way.

Figure 1:
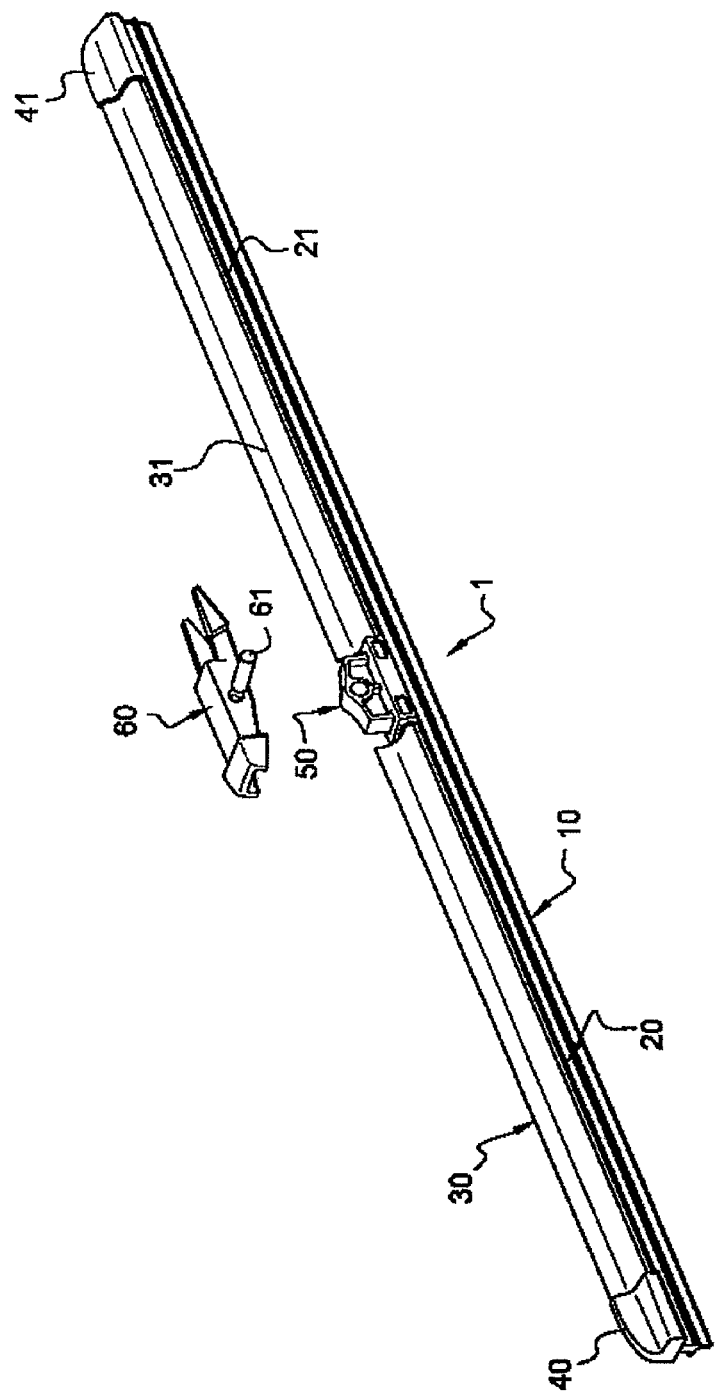
FIG. 1 illustrates a flat wiper blade, according to the invention.
Figure 2:
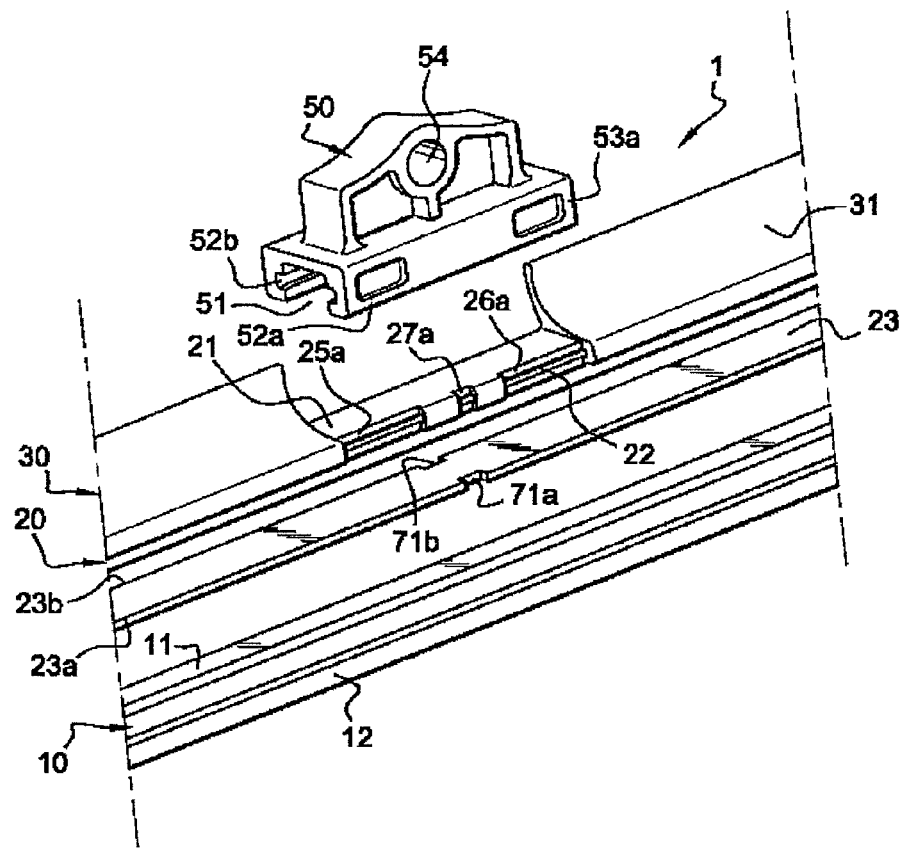
FIG. 2 is an exploded view of a portion of the wiper blade which can be seen in FIG. 1.

FIGS. 1 and 2 show a flat wiper blade 1, which is intended to be fitted on the wiper blade of the motor vehicle. Conventionally, and as can be clearly seen on the exploded view of FIG. 2, a flat wiper blade 1 is mainly composed of a wiping rubber blade 10, a bearing structure 20, a spoiler 30, two assembling elements 40,41 and a connector 50.

In concrete terms, the wiping rubber blade 10 is composed of a flexible section made of elastomer, which is mainly composed of a shoe 11 and a lip 12 jointed together through a portion with a smaller section, forming a hinge (FIG. 2).

Figure 5:
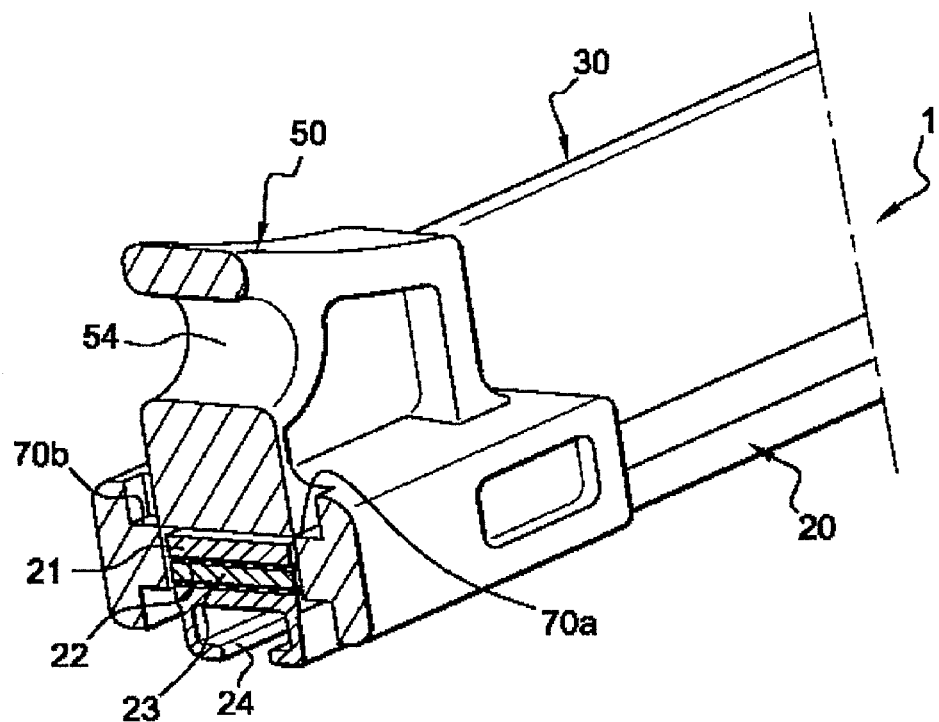
FIG. 5 is a cross-sectional view of a completely assembled wiper blade as made at the centre of the connector.
Figure 6:
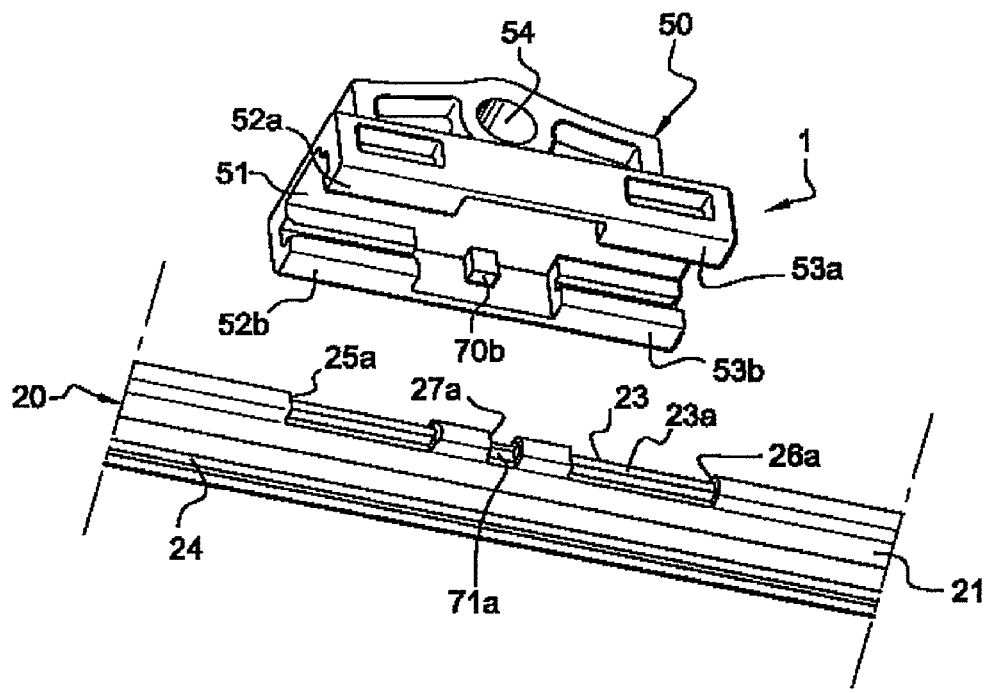
FIG. 6 shows a perspective exploded bottom view showing the internal conformation of the connector when the latter is made integral with the body of the wiper blade.
Figure 7:
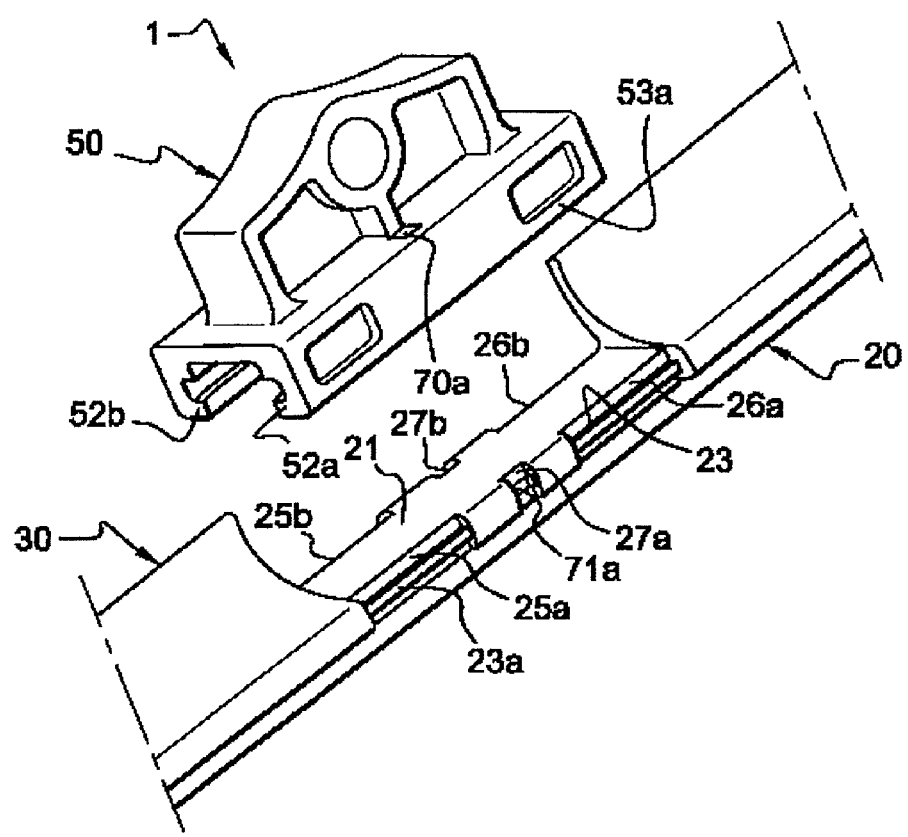
FIG. 7 is a view similar to FIG. 6, but in a top perspective view.

The bearing structure 20 is in the form of a plastic section 21, which longitudinally integrates on the one hand an internal recess 22 in which a metal vertebra is inserted 23 (FIG. 5) and, on the other hand, a holding rail 24 (FIGS. 5 and 6) wherein the shoe 11 of the wiping rubber blade 10 is positioned. Three openings 25a, 25b, 26a, 26b, 27a, 27b are additionally provided through each side of the section 21, so that, when the vertebra 23 is inserted into the internal recess 22, the side edges 23a, 23b of said vertebra 23 protrude from said openings 25a, 25b, 26a, 26b, 27a, 27b (FIGS. 6 and 7).

The spoiler 30 is also made of a section 31 but the latter is made of elastomer and it is made integral with the upper part of the section 21 of the bearing structure 20 or directly made with the section 21 by co-extrusion.

Both assembly elements 40, 41 are totally identical here. Conventionally, each of them is conformed so as to be able, on the one hand, to be fitted at one end of the bearing structure 20 and, on the other hand, to be directly clipped onto the vertebra 23.

As for the connector 50, it is formed so that it can fit substantially transversally onto the bearing structure 22 at the level of the opening 25a, 25b, 26a, 26b and be blocked in terms of movement in the fitting direction thereof by the portions of the side edges 23a, 23b which protrude from said openings 25a, 25b, 26a, 26b.

Therefore and as can be seen in particular in FIGS. 2 and 6, the connector 50 is first provided with an internal recess 51 which has a shape substantially matching that of the pierced portion of the bearing structure 20, i.e. the part of the section 21 in which the openings 25a, 25b, 26a, 26b, 27a, 27b are provided.

Figure 3:
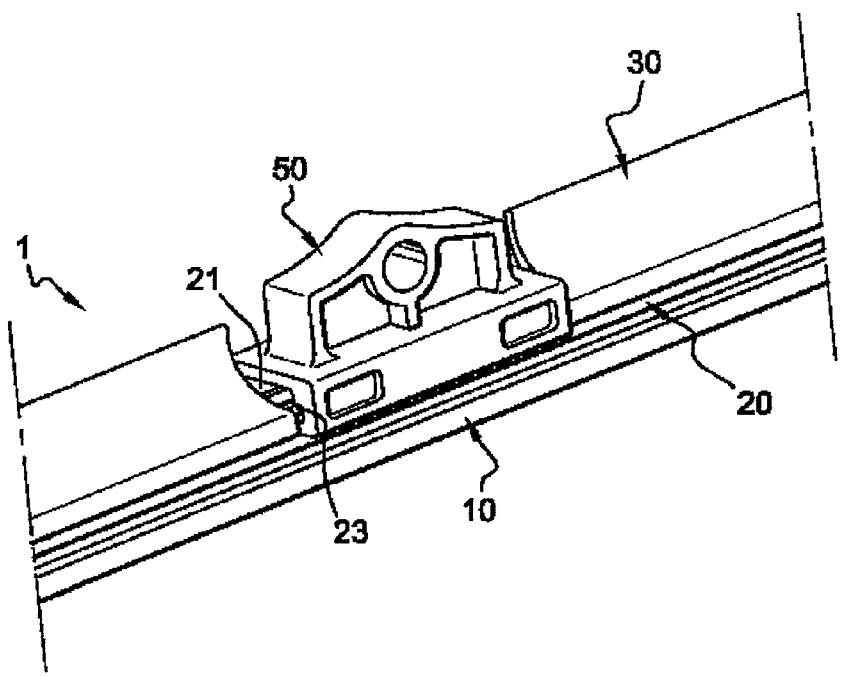
FIG. 3 shows the connector being mounted onto the body of the wiper blade.
Figure 4:
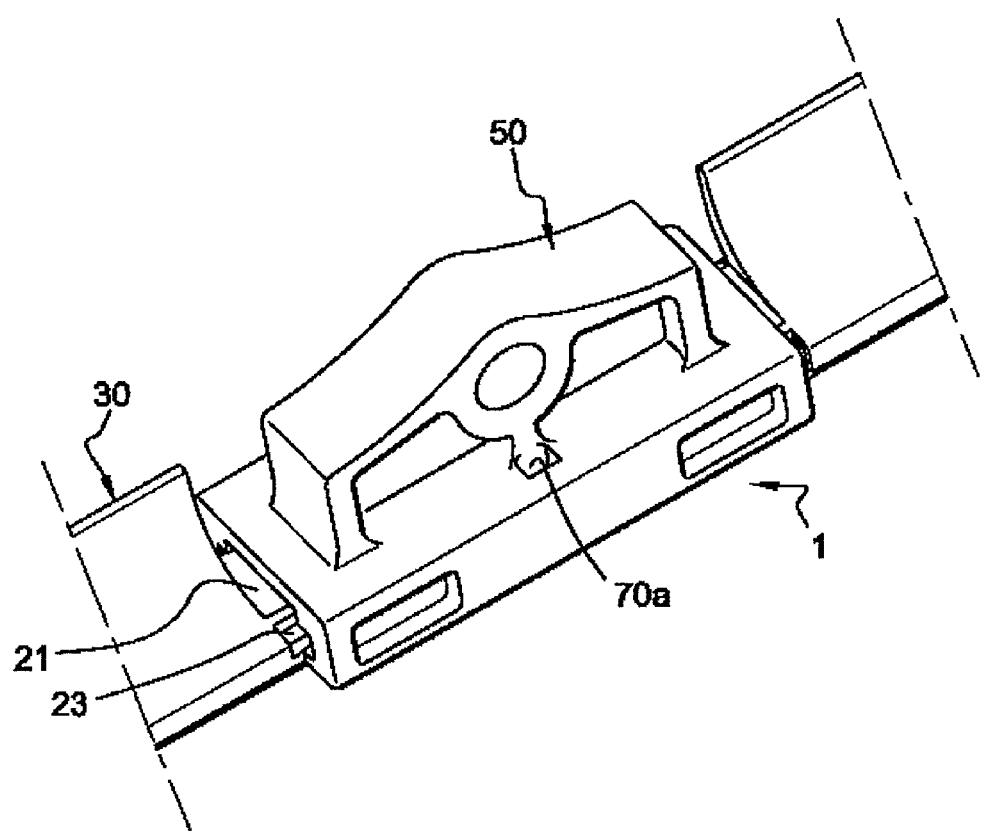
FIG. 4 shows the connector upon completion of the mounting phase onto the body of the wiper blade.

But the connector 50 is also provided with four claws 52a, 52b, 53a, 53b which may be engaged at the level of the openings 25a, 25b, 26a, 26b (FIGS. 6 and 7. The general dimensions are in fact compatible to be fitted only with the single pierced portion of the bearing structure 20, whereas the internal shape thereof is substantially matching the external shape resulting from the association of the section 21 and of the vertebra 23 at the level of an opening 25a, 25b, 26a, 26b. The assembly is so arranged that, once inserted into the section 21, the vertebra 23 blocks the connector 50 in the fitting direction thereof (FIGS. 3 to 5), with the side edges 23a, 23b of said vertebra 23 then playing the part of stops for the claws 52a, 52b, 53a, 53b of said connector 50.

In order to allow the mounting of the wiper blade 1 at the end of the arm of a driving mechanism, the connector 50 is associated with an adapter 60 which is pivotingly mounted with respect thereto through an axis 61 and which is the male part of reversible fastening means, with the matching female part being arranged at the end of the driving mechanism arm. A through-bore 54 forming a bearing is provided on the connector 50 so as to receive the axis 61.

According to the object of the present invention, the connector 50 includes two deformations 70a, 70b extending, each, inside a notch 71a, 71b which is formed in the vertebra 23 at the level of a portion of the side edge 23a, 23b directly accessible from the opening 27a, 27b (FIGS. 4 to 7).

According to a particularity of the invention, at least one notch 71a, 71b is formed on each side edge 23a, 23b of the vertebra 23 and a deformation extends inside each notch 71a, 71b.

This characteristic makes it possible to reinforce the holding of the vertebra 23 in the connector 50. In fact, deformations 70a, 70b exist on both sides of the connector 50 so that blockings are generated simultaneously on either side of the vertebra 23.

According to another particularity of the invention, at least two notches 71a, 71b which are symmetrical with respect to each other are respectively formed on each side edge 23a, 23b of the vertebra 23 and a deformation 70a, 70b extends inside each notch 71a, 71b.

Such an arrangement makes it possible to better optimise the holding of the vertebra 23 by the connector 50 thanks to a homogenous distribution of the deformations 70a, 70b and thus of the blocking forces on either side of the vertebra 23.

According to a currently preferred embodiment of the invention, each notch 71a, 71b of the vertebra 23 is arranged opposite an opening 27a, 27b exclusively dedicated to the access thereto (FIGS. 6 and 7).

This means, in other words, that each opening 27a, 27b does not participate in the fitting and the positioning of the connector 50 onto the bearing structure 20 and that the only function thereof is to enable a portion of the connector 50 to deform through the section 21 until it reaches the inside of the matching notch 71a, 71b.

This solution makes it possible, however, to advantageously disengage the fitting of the connector 50 and the holding of the vertebra 23, for a better efficiency of each one of the two functions considered separately. However, it can be considered, of course, to use a vertebra 23 having notches 71a, 71b extending opposite the openings 25a, 25b, 26a, 26b dedicated to the fitting of the connector 50 and to provide the deformations directly from the claws 52a, 52b, 53a, 53b.

In a particularly advantageous way, each notch 71a, 71b of the vertebra 23 has a size substantially identical to that of the opening 27a, 27b which is associated therewith (FIGS. 6 and 7).

This characteristic allows, when a deformation 70a, 70b reaches the bottom of the notch 71a, 71b, to provide, simultaneously with the blocking of the vertebra 23 with the connector 50, a blocking between the bearing structure 2) and said connector 50.

According to another advantageous particularity of the invention, each notch 71a, 71b extends on the entire thickness of the vertebra 23 (FIG. 2).

The interest of such a characteristic consists in making each notch 71a, 71b particularly accessible, which allows to provide the associated deformation 70a, 70b in multiple directions, for example parallel or perpendicular to the plane of the wiper blade 1.

Preferably, the connector 50 is made of a thermoplastic material.

It is understood that the invention more particularly concerns any wiper blade in particular for a motor vehicle which includes at least one wiper blade 1, as described above.

In addition, the invention relates to a method for making a wiper blade 1 comprising a bearing structure 20 in which the flexible vertebra 23 is longitudinally inserted, and on the sides of which are formed openings 25a, 25b, 26a, 26b, 27a, 27b exposing the side edges 23a, 23b of the vertebra 23, as well as a connector 50 which is fitted substantially transversally onto the bearing structure 20 at the level of the openings 25a, 25b, 26a, 26b and which is blocked in terms of movement in the fitting direction thereof by the portions of the side edges 23a, 23b protruding from said openings 25a, 25b, 26a, 26b.

This production method is remarkable in that it includes a step consisting in deforming at least a portion of the connector 50 creating a deformation 70a, 70b until the latter enters a notch 71a, 71b which is formed along the vertebra 23 and which is accessible through a bearing structure 20 via an opening 27a, 27b.

According to a particularity of this production method, the step of deformation consists in providing, on each side of the connector 50, at least one deformation 70a, 70b which cooperates with a notch 71a, 71b formed at the level of the matching side edge 23a, 23b of the vertebra 23.

The purpose is here to have at least two deformations 70a, 70b extending into two notches 71a, 71b respectively formed at the level of each one of the side edges 23a, 23b of the vertebra 23.

According to another particularity of the production method which is the subject of the invention, the step of deformation consists in providing at least two deformations 70a, 70b on the connector 50 which are substantially symmetrical with respect to each other in the plane of the wiping blade and which cooperate with two notches 71a, 71b provided substantially opposite and on either side of the vertebra 23.

In a particularly advantageous embodiment, each deformation 70a, 70b is provided in a direction substantially perpendicular to the body of the wiper blade 1.

This characteristic makes it possible to deform each portion of the connector 50 which is intended to create a deformation in the meaning of the invention, in the most direct possible way with respect to a notch 71a, 71b, which is dedicated for receiving same. The purpose is to optimise the penetration of material through the opening 27a, 27b firstly, then within the notch 71a, 71b secondly.

According to a current embodiment of the invention, each deformation 70a, 70b is provided in a direction substantially parallel to the plane of the wiper blade 1.

When positioned this way, each deformation 70a, 70b is not visible when the wiper blade 1 is looked at laterally, as it is hidden by the adapter 60, when seen from above. This is a significant advantage as regards aesthetics.

According to another particularity of the production method, each deformation 70a, 70b is provided after the positioning and locking of the connector 50 onto the bearing structure 20.

Preferably, each deformation 70a, 70b is provided by ultrasonic welding.

According to a first alternative embodiment of the invention, each deformation 70a, 70b can also be provided by hot forming.

It should be noted that these two solutions are perfectly adapted whenever the connector 50 is made of plastic.

According to a second alternative embodiment of the invention this time, each deformation 70a, 70b could also be made by cold forming.

In the last assumption, using a connector 50 made of metal is then more particularly recommended.

The invention claimed is:

1. A wiper blade comprising:
   a bearing structure in which a flexible vertebra is longitudinally inserted, wherein the bearing structure comprises, on corresponding sides, openings exposing side edges of the flexible vertebra; and
   a connector that is fitted substantially transversally onto the bearing structure at the level of the openings and that is blocked in terms of movement in the fitting direction thereof by portions of the side edges protruding from said openings,
   wherein the connector includes at least one deformation extending inside a notch formed in the vertebra at a portion of a side edge and accessible via one of the openings of the bearing structure.

2. The wiper blade according to claim 1, wherein at least one notch is formed on each side edge of the vertebra and wherein the deformation extends inside each notch.

3. The wiper blade according to claim 1, wherein at least two notches, symmetrical with respect to each other, are respectively formed on each side edge of the vertebra, and wherein a deformation extends inside each notch.

4. The wiper blade according to claim 1, wherein at least one notch of the vertebra is formed opposite an opening of the bearing structure, exclusively dedicated to the access thereof.

5. The wiper blade according to claim 1, wherein at least one notch of the vertebra has a size substantially identical to that of the opening which is associated therewith.

6. The wiper blade according to claim 1, wherein at least one notch extends on the whole thickness of the vertebra.

7. The wiper blade according to claim 1, wherein that the connector is made of a thermoplastic material.

8. The wiper blade according to claim 1, wherein the wiper blade is used in a motor vehicle.

9. A method for making a wiper blade including a bearing structure in which a flexible vertebra is longitudinally inserted, and on corresponding sides of which are formed openings exposing side edges on the vertebra, as well as a connector fitted substantially transversally onto the bearing structure at the level of the openings, wherein the connector is locked in terms of movement in the fitting direction thereof by portions of the side edges protruding from said openings, the method comprising:
   deforming at least one portion of the connector, creating a deformation until the connector enters a notch which is formed on the vertebra at the level of the portion of a side edge and accessible via one of the openings of the bearing structure.

10. The method according to claim 9, wherein deforming the at least one portion of the connector further comprises forming, on each side of the connector, at least one deformation which cooperates with a notch formed at the level of a matching side edge of the vertebra.

11. The method according to claim 9, wherein deforming the at least one portion of the connector further comprises forming, on the connector, at least two deformations which are substantially symmetrical with respect to each other in the plane of the wiper blade, wherein the at least two deformations cooperate with two notches formed substantially opposite each other on either side of the vertebra.

12. The method according to claim 9, wherein each deformation is provided along a direction substantially perpendicular to the body of the wiper blade.

13. The method according to claim 9, wherein each deformation is provided according to a direction substantially parallel to the plane of the wiper blade.

14. The method according to claim 9, wherein each deformation is provided after the positioning and the blocking of the connector on the bearing structure.

15. The method according to claim 9, wherein each deformation is provided by ultrasonic welding.

16. The method according to claim 9, wherein each deformation is provided by hot forming.

17. The method according to claim 9, wherein each deformation is provided by cold forming.

* * * * *